United States Patent

[11] 3,607,387

| [72] | Inventors | Vincent L. Lanza;<br>Edward C. Stivers, both of Atherton, Calif. |
|---|---|---|
| [21] | Appl. No. | 760,713 |
| [22] | Filed | Sept. 18, 1968 |
| [45] | Patented | Sept. 21, 1971 |
| [73] | Assignee | Raychem Corporation<br>Menlo Park, Calif. |

[54] FLAME RESISTANT POLYIMIDE-COATED CONDUCTOR HAVING A LINEAR POLYIMIDE LAYER COVERED BY AN AROMATIC POLYAMIDE
9 Claims, 2 Drawing Figs.

[52] U.S. Cl. ...................................... 117/218,
117/75, 117/72, 117/232, 117/128.4, 117/161, 161/214, 161/227, 161/252, 174/120
[51] Int. Cl. ........................................ H01b 7/02,
H01b 3/00
[50] Field of Search............................................ 161/214, 227, 252; 117/72, 128.4, 132 B, 132 C, 161, 218; 260/47, 75; 174/110, 120 SR, 121 SR

[56] References Cited
UNITED STATES PATENTS

| 3,242,128 | 3/1966 | Chalmers ..................... | 260/32.6 |
| 3,271,366 | 9/1966 | Kreuz ........................... | 260/47 |
| 3,316,212 | 4/1967 | Angelo ......................... | 260/47 |
| 3,326,863 | 6/1967 | Tatum et al.................. | 260/78.4 |
| 3,342,768 | 9/1967 | Chalmers ..................... | 260/32.6 |

*Primary Examiner*—John T. Goolkasian
*Assistant Examiner*—Willard E. Hoag
*Attorney*—Lyon and Lyon

ABSTRACT: Laminates primarily for electrical insulation comprise at least one lamina of a thermoplastic polyimide, e.g., poly(1, 12-dodecamethylene pyromellitimide) and a covering lamina of an infusible or high-melting polymer, especially an aromatic polyimide. An insulated airframe wire is described in detail.

PATENTED SEP 21 1971   3,607,387

VINCENT L. LANZA
EDWARD C. STIVERS
INVENTORS.

BY Lyon Lyon
ATTORNEYS

FLAME RESISTANT POLYIMIDE-COATED CONDUCTOR HAVING A LINEAR POLYIMIDE LAYER COVERED BY AN AROMATIC POLYAMIDE

BACKGROUND OF THE INVENTION

This invention relates to structures formed at least in part from polyimides, and to process for their manufacture.

In copending application Ser. No. 760,659 filed of even date herewith, entitled "Polymers, Process and Articles," the invention of Edward C. Stivers, the disclosure of which is incorporated by reference herein, there are described certain thermoplastically processable polymers, more specifically, poly(1,12-dodecamethylene pyromellitimide) and poly(1,13-tridecamethylene pyromellitimide). As stated in that application, these polymers may be extruded into tubing, sheets and films at temperatures above their melting points, and have good mechanical and electrical properties which make them well suited, for example, for insulation of electrical components, e.g., wires and cables. THeir good high-temperature properties may be enhanced by cross-linking, especially irradiation cross-linking.

Although electrical components insulated by these processable polyimides meet many purely electrical requirements, the insulation has to be capable of meeting increasingly stringent nonelectrical tests to ensure its safety and reliability under severe conditions. Moreover, many of these requirements are to some extent conflicting, in that a physical property essential to meet one test is a disadvantage when the material is subjected to another. In many wire and cable applications, for example, it is necessary that the insulation be flexible so that the wire can be given various configurations. It is also necessary, however, that the insulation have a low notch sensitivity, i.e., that a cut in the surface of the insulation does not propagate through to the conductor. Notch sensitivity decreases with the elastic modulus of a material, but materials with a high moduli are not flexible except in thin layers.

In many applications, for example, in insulation for aircraft, where fuel, lubricants and hydraulic fluids are present, the insulation must be unaffected by prolonged exposure to such materials. Further, as operating temperatures of electrical and electronic equipment increase, improved resistance to heat-aging is required; i.e., the ability to operate for prolonged periods at elevated temperatures is necessary. A further requirement is resistance to fire. Although it is possible to incorporate flame retardants in the insulating materials, such additives often have deleterious effects on other properties of the material, especially the physical and electrical properties, and they may cause corrosion of the electrical components to be insulated. It has previously been proposed to meet these requirements for insulation by combining one or more materials in a laminate. Such proposed solutions have still suffered from the disadvantage of not meeting one or more of these requirements, unless an undesirable large weight of insulation has been applied to a component. Weight and size are, however, becoming increasingly critical in such applications as the aircraft industry. The weight and size of the many miles of wire necessarily carried by a modern aircraft cause increased operating costs, and it is therefore a matter of concern to reduce these where possible by the use of lighter and smaller insulation.

SUMMARY OF THE INVENTION

It is an object of the present invention to provide a laminate which combines the properties of low density and good electrical properties with resistance to fire, mechanical abuse and chemical attack. The present invention provides a laminate comprising at least one lamina of a thermoplastically processable polyimide and at least one lamina of an intractable polymer, for example an aromatic polyamide. The laminate may contain laminae of other materials, and the laminate may be applied to or in contact with a substrate, for example an electrical component to be insulated. The invention accordingly also provides an electrical component, especially an electrical conductor, having an insulation comprising a thermoplastically processable polyimide lamina and an intractable polymer lamina. The laminae may, of course, be formed of compositions comprising the above-specified polymers in admixture with other materials, for example, blends with other polymers, and compositions consisting essentially of the specified polymer with the usual additives, and the polymers may be cross-linked where appropriate.

The term "aromatic polyimide" relates to those polymers derived from predominately aromatic starting materials, as exemplified in U.S. Pat. No. 3,179,630 to 3,179,634, such materials being generally not amendable to processing, and being formed in situ from a processable precursor, e.g., a polyamic acid. Examples of the manufacture and conversion of such acids are given U.S. Pat. No. 3,179,614 assigned, as are No. 3,179,630 to 3,179,634 to E. I. du Pont de Nemours and Company, the disclosures of all which patents are incorporated herein by reference.

DESCRIPTION OF THE PREFERRED EMBODIMENTS

Figure 1:
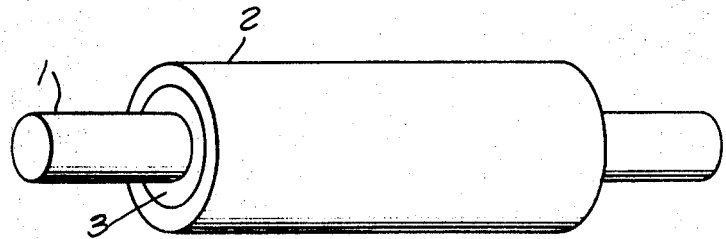
FIG. 1 is a schematic view of a conductor insulated according to the present invention.

A preferred embodiment of the present invention is a laminate for electrical insulation comprising two or more laminae of a thermoplastically processable polyimide, one or more laminae of an aromatic polyimide and optionally a lamina of a pigment-comprising thermoplastically processable polyimide. The above specified laminae are listed in the preferred order, beginning with that nearest to the body to be insulated.

Clearly, the dimensions of the various laminae will vary with the intended use of the laminate, as will the relative dimensions of the laminae. It will be obvious to those skilled in the art that it is a matter of simple experiment to determine dimensions and ratios of dimensions suitable for insulating a wire of a particular gauge; the dimensions will depend not only on the dimensions of the wire but also the number of wires in the cable, the electrical stresses to which the wire is to be subjected in normal use and in overload, the physical maltreatment likely, the flexibility and weight requirements, etc.

In general, however, it has been found that the processable polyimide may suitably form from about 65 to 95 percent of the wall thickness, measured radially, of a given wire insulation, preferably 75 to 85 percent of the thickness. In general, a total thickness of at least about 0.0005 inch, preferably at least 0.001 inch, of aromatic polyimide lamina or laminae should be present to reduce the access of oxygen to an acceptable level, to achieve flame-resistance and good heat-aging.

The laminate may be formed by casting, extrusion, coating, deposition or any other technique suitable for forming layers of the materials concerned. The processable polyimide may be extruded, for example in the form of a tube, and further laminae (either of the processable polyimide itself or of a different thermoplastically processable polymer) may be extruded over the first material. Alternatively, two or more laminae may be simultaneously extruded. Laminae of materials such as the aromatic polyimide which cannot be extruded or otherwise thermoplastically processed may be applied to the surface of a previously formed lamina by, for example, brush-coating or spraying with or immersion in a solution of dispersion of a precursor of the material or a dispersion of the material itself. For example, an aromatic polyimide may be applied to the surface of a lamina in the form of a solution or dispersion of its precursor, the corresponding polyamic acid. This can then be heated to convert it to lamina of the polyimide. The smooth finish obtainable with an outer lamina which is applied by coating provides a product which has a good appearance and improved handling properties.

The suitability of a particular polymer for use as the "intractable" polymer is determined by physical properties rather than by the chemical structure of the polymer. It is therefore to be understood that the invention is not limited to the use of aromatic polyimides as the "intractable" polymer. Such polyimides have the physical properties necessary for this invention, and are to be regarded as illustrative examples of suitable materials. These polyimides do, however, have the additional advantage that in the form of the polyamic acid precursor they have very good compatibility as shown by good adhesion, with the thermoplastic polyimide, being soluble in the same solvents. Such compatibility is of course a desirable property of the intractable polymer at least in the form in which it is applied.

Other desirable properties include nonflammability, high melting temperature (at least that of the thermoplastic polyimide and preferably above the pyrolysis temperature of the thermoplastic polyimide) or, preferably, infusibility, high-temperature oxidation resistance (so as to give the product a life of at least 200 hours at 200°C.), high solvent resistance, an elongation at room temperature of at least 50 percent, at least in a layer of the thickness used, high elastic modulus, and high cut-through resistance.

The invention is further illustrated by reference to the drawings. Fig. 1 shows electrical conductor 1 which is insulated by an outer coat 2 of a processable polyimide and an inner coat 3 of an infusible aromatic polyimide. If desired, there may be two or more inner coats of the processable polyimide and/or two or more outer coats of the infusible aromatic polyimide.

Figure 2:
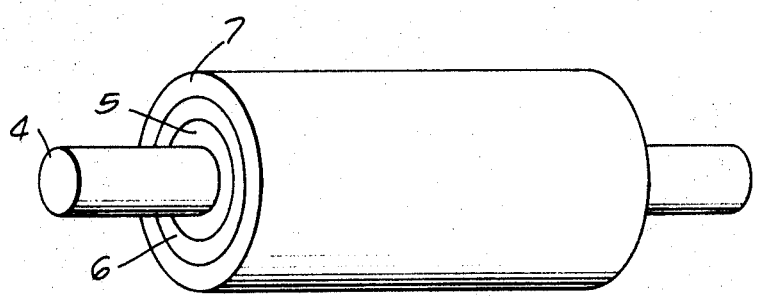
FIG. 2 is a schematic view of a conductor insulated according to an alternate embodiment of the present invention.

FIG. 2 illustrates an electrical conductor 4 which is insulated by an inner and an outermost coat of a processable polyimide 5 and 7 and an intermediate coat of an infusible aromatic polyimide 6.

EXAMPLE 1

A 20 AWG stranded (19/32) silver plated copper conductor having an outside diameter of 0.040 inch was insulated with a composition consisting of

|  | Parts by weight |
| --- | --- |
| Poly (1,12 -dodecamethylene pyromellitimide), inherent viscosity 1.2 | 97 |
| Irganox 1010 (pentaerythrityltetra-3,5-ditert-butyl-4-hydroxy dihydrocinnamate) | 1.5 |
| Trinonyl phenyl phosphite | 1.5 |

The inherent viscosity values given in this specification were measured in m-cresol at 70° C., at a concentration of 0.5 g./100 ml. The composition was in the form of a powder blend, and was applied to the conductor by tubing from a 1.5 inch Sterling 24 to 1 length/diameter vented extruder operating at temperature of 305° C. (rear) to 330° C. (front) in five zones under a vacuum of approximately 28 inch Hg, the wire being preheated to about 315° C. An insulation of approximately 0.004 inch wall thickness was applied, resulting in an outside diameter of 0.048 to 0.049 inch. A second layer of the same composition was then extruded over the insulated conductor preheated to about 180° C. to give an overall outside diameter of 0.057 to 0.058 inch, using the same temperature profile as in the first extrusion.

The insulated wire was then coated with a layer of the polymer derived from oxydianiline and pyromellitic dianhydride, i.e., poly(4,4'-phenyl ether pyromellitimide). This polymer, supplied in the form of a 17 percent solids content solution of the polyamic acid precursor in N-methylpyrrolidone by E. I. du Pont de Nemours and Company under the designation RC–5044, was applied as the precursor from a bath of the solution which had been concentrated to a 25 percent solids content by partial evaporation of solvent. The coated wire was passed at 3 feet per minute from the bath upwardly through an oven, 10 feet high, having a bottom heater set at 205° C. and a top heater set at 320° C. The resulting cured layer of aromatic polyimide had a thickness of approximately 0.0006 inch. Good adhesion of the layer to the thermoplastic polyimide was observed. This process was twice repeated, successive layers of 0.0005 and 0.0004 inch being applied, to give a wire of final outside diameter 0.060 to 0.061 inch having a clear red-brown color.

EXAMPLE 2

A sample wire as obtained in example 1 was irradiated by high-energy electrons from a 1 Mev. General Electric resonant transformer to a dose of 80 mr. The Young's modulus of the wire at 325° C. in nitrogen was 25 p.s.i., and the gel content of the cross-linked poly(1,12-dodecamethylene pyromellitimide) measured in refluxing m-cresol was approximately 85 percent.

EXAMPLE 3

The procedure of example 1 was repeated, except that only two layers of aromatic polyimide were applied to the conductor insulated with the thermoplastic polyimide. The coated conductor was then further coated with a solution of the polyamic acid precursor of the thermoplastic polyimide. This was a 37 percent solids content solution of the corresponding polyamic acid in dimethylacetamide containing 2 percent (based on polymer) of Irganox 1010 and 25 percent (based on polymer) of pigment-grade titanium dioxide (E. I. du Pont de Nemours TiPure R–900). The latter was incorporated into the solution by blending on a 3-roll paint mill at room temperature and degassing.

The coating was cured in the manner described in example 1, the outer layer being 0.0005 inch thick, giving an insulated wire if a final diameter of 0.061 inch, white in color, and readily markable.

EXAMPLE 4

A 20 AWG stranded (19/32) silver-plated copper conductor was insulated by the following composition:

|  | Parts by Weight |
| --- | --- |
| Poly (1,12-dodecamethylene pyromellitimide), inherent viscosity 1.6 | 98 |
| Irganox 1010 | 2 |

The composition was powder-blended and tubed onto the conductor in a 1.5-inch Sterling vented extruder operating at temperatures of 315° C. (rear) to 360° C. (front) in five heating zones, the wire being preheated to 325° C. A layer of 0.0085 inch wall thickness was applied, giving a product of outside diameter 0.057 inch. This was then coated with three layers of aromatic polyimide by the process described in example 1.

EXAMPLE 5

Lengths of wire as described in example 4 were hung over an 0.75 inch diameter rod, each end of each wire being weighted with a load of 2 pounds, as were samples of similar wire insulated with 0.0085 of poly(1,12-dodecamethylene pyromellitimide) but without the aromatic polyimide coating. All the samples were placed in a forced air oven at 200° C., for the periods specified in the table below. After the specified period, the samples were removed and the portion of the wire which was around the rod immersed in a salt solution at room temperature. An increasing voltage was then applied to the conductor, and the voltage at which insulation broke down noted. The samples were also examined, on removal from the oven, for cracks in the insulation at the end of the insulated portion and at the portion bent around the rod.

| Days in Oven | Unlaminated Polymer Breakdown Voltage (Kv) | Laminate Breakdown Voltage (Kv) |
|---|---|---|
| 6 | 16 | 13 |
| 7 | 13 | 12 |
| 8 | 12 cracks at end sample | 13 |
| 9 | cracked at bent portion | 11 |
| 10 | | cracked at bent portion |

It will be seen that the provision of a layer of aromatic polyimide increases the life of the insulation from 7 to 9 days at 200° C. It is believed that this is achieved by limiting the access of oxygen to the lamina of the thermoplastic polyimide. Samples of the same two materials were tested for flammability by the test specified in the U.S. Military Specification MIL-W-81044 (referred to as the 60° test) and in a vertical test. In the latter test, a sample insulated wire is hung vertically and the tip of a 1.5-inch high flame is contacted with the bottom of the insulation for 12 seconds. The flame is then removed and the time of burning noted.

| | Time of Burning (seconds) | |
|---|---|---|
| | Unlaminated Polymer | Laminate |
| Vertical | Burns completely | 3-4 |
| 60° | 14* | 1-2 |

*1.5 to 2 inches of polymer flowed down into the flame

Thus, the provision of the thin layer of aromatic polyimide very effectively renders the polymer insulation flame-resistant.

EXAMPLE 6

The properties of 20 AWG coated copper wire (stranded 19 strands of 32 AWG wire) insulated by a laminate of the present invention, prepared as described in example 1, were compared with those of similar wire insulated by a number of materials presently used or proposed for use as insulation for airframe wire. Although the dimensions of the various insulated wires differ, all wires tested were of the size selected for the stated purpose–general use in cables connecting electric and electronic components in aircraft. In all materials, there are two polymers, indicating, as stated above, that the conflicting requirements have necessitated a combination of properties. In wires B, C, and D, the first material forms the inner layer and the second the outer layer of insulation. In wire E, the two materials are in the form of a laminated tape which is wrapped around the conductor and heated to melt the fluorinated ethylene propylene copolymer to give a thin-walled insulation. Wire A is the product of example 1 of the present specification. The numbers given in the Table indicate the order or rating of the various wires ( 1 = best). Where the difference in results was not sufficient to distinguish between a slight difference in properties and experimental or sampling error, the wires concerned have been given equal ratings. A blank indicates that the wire concerned could not be tested (because the insulation had failed at the temperature concerned).

| Wire Types | |
|---|---|
| B | polyethylene/polyvinylidene fluoride |
| C | fluorinated ethylene propylene copolmer/ polyvinylidene fluoride |
| D | polyvinyl chloride/polyvinylidene fluoride |
| E | fluorinated ethylene propylene copolymer/ aromatic polyimide |

WIRE TYPE

| Property or Test | A | B | C | D | E |
|---|---|---|---|---|---|
| Weight (Lightest = 1) | 2 | 3 | 4 | 5 | 1 |
| Outside Diameter (smallest = 1) | 2 | 5 | 3 | 4 | 1 |
| Tape Abrasion ($^1$) | 2 | 1 | 2 | 4 | 5 |
| Scrape Abrasion($^2$) | 1 | 2 | 4 | 3 | 5 |
| Dynamic Cut-thru (25° C.) ($^3$) | 1 | 3 | 4 | 4 | 2 |
| Dynamic Cut-thru 200° C. | 2 | 3 | 3 | | 1 |
| Static Cut-thru 25° C. ($^4$) | 1 | 3 | 5 | 4 | 2 |
| Solvent Resistance ($^5$) | 1 | 3 | 3 | 5 | 1 |
| Current Overload 35 Amp | 1 | 3 | 4 | 5 | 1 |
| Current Overload 40 Amp | 1 | 2 | 4 | 5 | 3 |

Notes on Tests
1. 2 lb./400 grit tape
2. 800g./0.005 inch flat
3. 0.005 inch flat, 0.2 inch/minute
4. 0.005 inch flat, 90° wedge
5. Hydraulic Fluid "Skydrol"

All wires listed passed tests on insulation resistance, cold bend (at −65° C.), flammability (60° and vertical) and notch sensitivity. In the quantitative tests listed, the laminate of the present invention has the highest overall performance, indicating that the combination of the thermoplastically processable polyimide and an intractable polymer provides an outstanding electrical insulation.

We claim:

1. An insulated electrical conductor, the insulation comprising an inside coat of poly(1,12-dodecamethylene pyromellitimide) and an outside coat of an infusible aromatic polyimide.

2. An insulated wire, the insulation comprising two coats of poly(1,12-dodecamethylene pyromellitimide) underlying at least two coats of an infusible aromatic polyimide.

3. An insulated wire as claimed in claim 2 having an additional outermost coat comprising pigmented poly(1,12-dodecamethylene Pyromellitimide).

4. A wire as claimed in claim 3, wherein the aromatic polyimide is poly(4,4'-phenyl ether pyromellitimide).

5. An insulated wire, the insulation comprising at least two coats consisting essentially of poly(1,12-dodecamethylene pyromellitimide) underlying at least two coats consisting essentially of poly(4,4'-phenyl ether pyromellitimide).

6. An insulated electrical conductor as claimed in claim 1, wherein the inside coat is cross-linked.

7. An insulated electrical component, the insulation of which comprises an inside coat of a thermoplastic polyimide selected from the group consisting of poly (1,12-dodecamethylene pyromellitimide) and poly(1,13-tridecamethylene pyromellitimide) and an outside coat of an infusible aromatic polyimide.

8. An insulated electrical component as claimed in claim 7 as having an additional outermost coat comprising a pigmented coat of poly(1,12-dodecamethylene pyromellitimide).

9. An insulated electrical component as claimed in claim 7, wherein the inside coat is an extruded coat.